(12) United States Patent
Herwald et al.

(10) Patent No.: US 6,914,400 B2
(45) Date of Patent: Jul. 5, 2005

(54) METHOD AND APPARATUS FOR SYNCHRONIZING A SCAN OPERATION WITH THE MOTION OF THE SCAN MECHANISM

(75) Inventors: Marc Alan Herwald, Lexington, KY (US); Gretchen Yvonne Gibson, Lexington, KY (US); Michael Anthony Marra, III, Lexington, KY (US); Joseph Kamal Yackzan, Lexington, KY (US)

(73) Assignee: Lexmark International, Inc., Leington, KY (US)

( * ) Notice: Subject to any disclaimer, the term of this patent is extended or adjusted under 35 U.S.C. 154(b) by 0 days.

(21) Appl. No.: 10/414,531

(22) Filed: Apr. 15, 2003

(65) Prior Publication Data

US 2004/0207353 A1 Oct. 21, 2004

(51) Int. Cl.⁷ .................................................. H02P 7/00
(52) U.S. Cl. ....................... 318/466; 318/467; 358/451; 358/497; 235/454
(58) Field of Search ................................ 318/466–472, 318/602, 254, 616, 439, 603, 270; 355/3 SH; 347/235, 248; 358/474, 300

(56) References Cited

U.S. PATENT DOCUMENTS

| | | | | |
|---|---|---|---|---|
| 4,243,925 A | * | 1/1981 | Gnuechtel ................... 318/603 |
| 4,519,700 A | * | 5/1985 | Barker et al. ................ 399/394 |
| 4,731,657 A | * | 3/1988 | Miyagi ........................ 358/497 |
| 4,833,544 A | * | 5/1989 | Sato et al. .................. 358/451 |
| 4,837,486 A | | 6/1989 | Geens et al. |
| 4,837,636 A | * | 6/1989 | Daniele et al. ............. 358/300 |
| 5,451,777 A | | 9/1995 | Blake et al. |
| 5,631,691 A | * | 5/1997 | Furuta et al. ............... 347/235 |
| 5,710,751 A | * | 1/1998 | Hoover et al. ............... 369/97 |
| 5,744,795 A | * | 4/1998 | Bianchi et al. ............. 250/234 |
| 5,750,985 A | | 5/1998 | Suzuki |
| 5,760,817 A | * | 6/1998 | Foote et al. ................. 347/248 |
| 5,825,398 A | * | 10/1998 | Furuta et al. ................ 347/235 |
| 5,917,881 A | * | 6/1999 | Jeffery ........................ 378/98.8 |
| 6,037,584 A | * | 3/2000 | Johnson et al. ............. 250/235 |
| 6,037,734 A | * | 3/2000 | Toyomura .................... 318/602 |
| 6,055,008 A | * | 4/2000 | Bliss ........................... 347/133 |
| 6,069,464 A | | 5/2000 | Wu |
| 6,122,068 A | | 9/2000 | Torisawa et al. |
| 6,209,984 B1 | | 4/2001 | Kim |
| 6,330,096 B1 | * | 12/2001 | Makino ....................... 359/216 |
| 6,333,499 B1 | * | 12/2001 | Sato ............................ 250/234 |
| 6,344,906 B1 | | 2/2002 | Gatto et al. |
| 6,371,370 B2 | * | 4/2002 | Sadler et al. ................ 235/454 |
| 2002/0109009 A1 | * | 8/2002 | Sadler et al. ................ 235/454 |
| 2003/0063329 A1 | * | 4/2003 | Kaneko et al. ............. 358/474 |
| 2004/0004123 A1 | * | 1/2004 | Sadler et al. ................ 235/454 |

OTHER PUBLICATIONS

New High Torque 5 Phase Geared Step Motor with Compact Driver, Oriental Motor USA Corp, prior to May 1997.*

* cited by examiner

*Primary Examiner*—Paul Ip
(74) *Attorney, Agent, or Firm*—Ronald K. Aust, Esq.

(57) ABSTRACT

A scanning operation is synchronized with the motion of a scan mechanism. Encoder signals indicative of a position of the scan mechanism relative to a scan platen or an object being scanned are received. These encoder signals may include a single channel phase signals are channel A and channel B phase signals. Transitions of the encoder signals are detected. Scan pulses for triggering a scan operation by a scan element are generated based on transitions of the encoder signals. Differences in the encoder signal resolution and a desired scan resolution are compensated for in the generation of the scan pulses. A transfer signal is generated in synchronization with the scan pulses for controlling output of data from the scan element. Variations of the velocity of the scan mechanism cause variations of the frequency at which the scan pulses are generated. Variations in the velocity of the scan mechanism are accounted for during this synchronization by varying the duration of the transfer state of the transfer signal in relation to the variations of the scan pulse frequency. The duration of the exposure state of transfer signal is kept constant, ensuring a constant exposure time for the scanning device.

61 Claims, 10 Drawing Sheets

FIG.9 ns of the encoder signals. Differences in the encoder signal resolution and the desired scan resolution are compensated for in the generation of the scan pulses.

According to a second aspect, transfer signals for controlling output of data from the scan element are generated in synchronization with the scan pulses, taking into account variations in the velocity of the scan mechanism. Transfer signals for controlling output of scanned data are generated based on the scan pulses. Since variations of the velocity of the scan mechanism cause variations of the frequency of the scan pulses, variations in the velocity of the scan mechanism are accounted for by varying the duration of the transfer state of the transfer signal in relation to the variations of the frequency of the scan pulses are generated. The duration of the exposure state of the transfer signal is kept constant, ensuring a constant exposure time for the scanning device.

METHOD AND APPARATUS FOR SYNCHRONIZING A SCAN OPERATION WITH THE MOTION OF THE SCAN MECHANISM

BACKGROUND

The present invention is directed to a method and apparatus for synchronizing a scan operation. More particularly, the present invention is directed to a method and apparatus for synchronizing a scan operation with the motion of a scan mechanism.

To achieve optimal scan quality, it is desirable to synchronize the motion of a scan mechanism with the scanning operation and the output of the scanning device.

For a stepper-based scan mechanism, the signal that drives the stepper motor may be used to synchronize motion of the mechanism with the scanning operation. This makes it possible to ensure a constant scan rate, if desired.

In contrast, for a DC motor-based scan mechanism, it is desirable to scan based off of the feedback from encoder signals representing the position and velocity of the scan mechanism. In a conventional DC motor-based scan system, an encoder is provided on a shaft of the DC motor. The encoder generates signals each time the drive source rotates by a certain angle. The encoder produces two signal channels, commonly referred to as the channel A phase signal and the channel B phase signal. Edge detectors detect the leading edge and trailing edge of each of the channel A phase signal and channel B phase signal and produce pulses. These pulses are used to synchronize the motion of the scan mechanism with the scan operation.

Several issues arise in synchronizing a scan mechanism using a DC motor with a scan operation. For example, this type of scan mechanism is not guaranteed to move at a constant velocity. Therefore, there is no guarantee that the encoder signals have a constant frequency. Also, the encoder resolution, e.g., counts-per-inch, does not always match the desired scan resolution. This is typically a problem when the encoder resolution is less than the desired scan resolution. The problem is further complicated by the reduced scan speeds of high quality scan modes, during which the scan mechanism is moved at a slower rate of speed.

There is thus a need for a technique for synchronizing the motion of a scan mechanism with a scanning operation that takes into account velocity variations of the scan mechanism.

SUMMARY

It is an object of the present invention to provide a method and system for synchronizing motion of a scan mechanism with a scan operation, compensating for differences in encoder resolution and desired scan resolution and taking into account velocity variations of the scan mechanism.

According to exemplary embodiments, this and other objects are met by a method and system for synchronizing output of a scanning device with the motion of a scan mechanism within the device.

According to a first aspect, encoder signals indicative of a position of the scan mechanism relative to a scan platen or an object being scanned are received. These encoder signals may include a channel A phase signal and a channel B phase signal. Transitions of one or both of the encoder signals are detected. Scan pulses for triggering a scan operation by a scan element are generated based on the detected transitions

DETAILED DESCRIPTION

According to exemplary embodiments, a method and apparatus are provided for synchronizing a scanning operation with the motion of a scan mechanism, e.g., a scan mechanism driven by a DC motor.

Figure 1A:
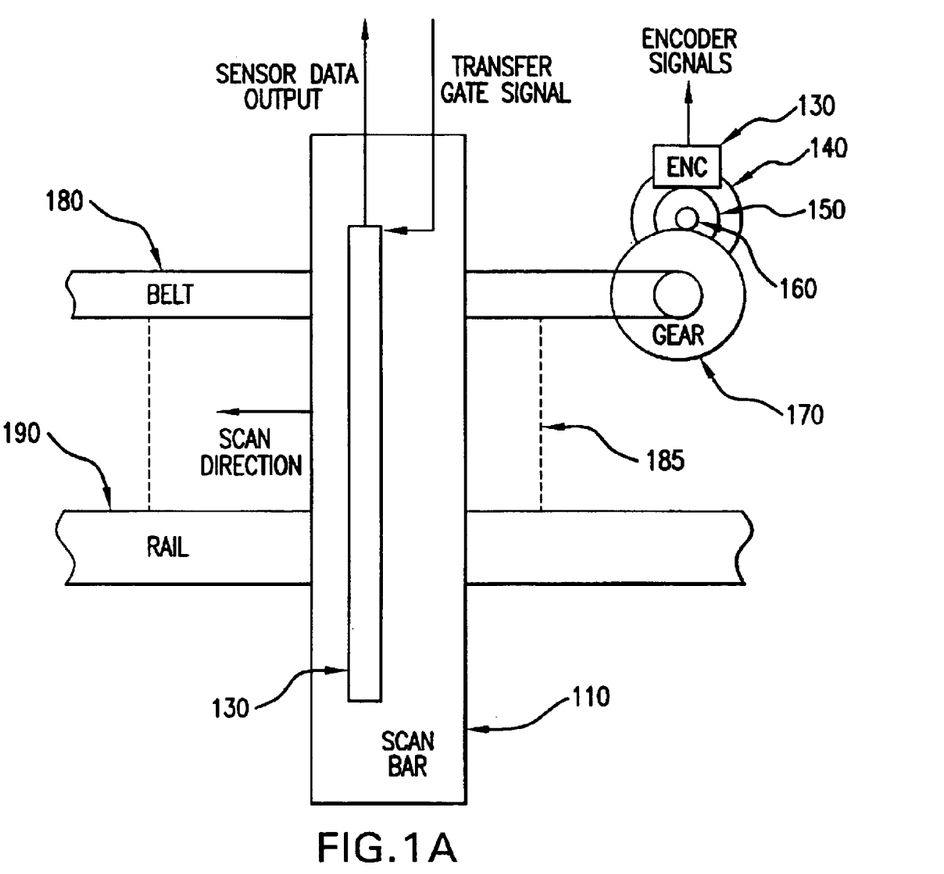
FIGS. 1A–1C illustrate an exemplary system in which the invention may be implemented.
Figure 1B:
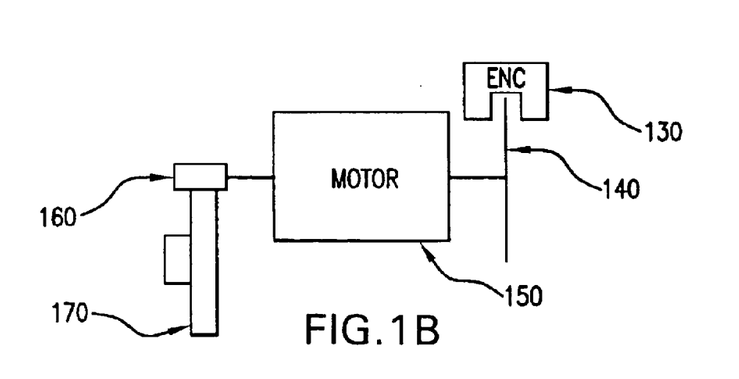

FIG. 1A illustrates a scanning device in which the invention may be implemented. The scanning device includes a motor system and a scan system. The motor system includes an encoder 130, an encoder disk 140, a DC motor 150, a motor gear 160 and a gear 170. A side view of the motor system is shown in FIG. 1B.

The scan system includes a scan bar 110 on which a sensor 120 is mounted. The sensor may be, e.g., a Charge Coupled Device (CCD) or a Contact Image Sensor (CIS). The sensor includes a sensor array and an analog shift array. Scanned data is exposed in the sensor array and then transferred to the shift array for output. A belt 180 causes the scan bar 110 to move over a platen 185 on which an object to be scanned is placed. The rail 190 supports the scan bar 110.

The motor 150 controls rotation of the motor gear 160, which in turns control rotation of the gear 170, causing the belt 180 to move in a scanning direction. The scan bar 110 connected to the belt 180 moves in the same direction across a platen 185.

The motor 150 also control rotations of an encoder disk 140. The encoder 130 produces encoder signals when the encoder disk 140 rotates by predetermined angles. For example, an encoder wheel with 450 evenly distributed marks would produce a change either channel A or channel B of the encoder signals every 0.2 degrees.

The encoder signals are used to control the velocity of the motor 150. Also, the encoder signals are used to generate scan pulses for triggering scan operation and to produce transfer signals for controlling the sensor data output in a manner that is synchronized with the motion of the motor. This is shown in more detail in FIG. 1C.

Figure 1C:
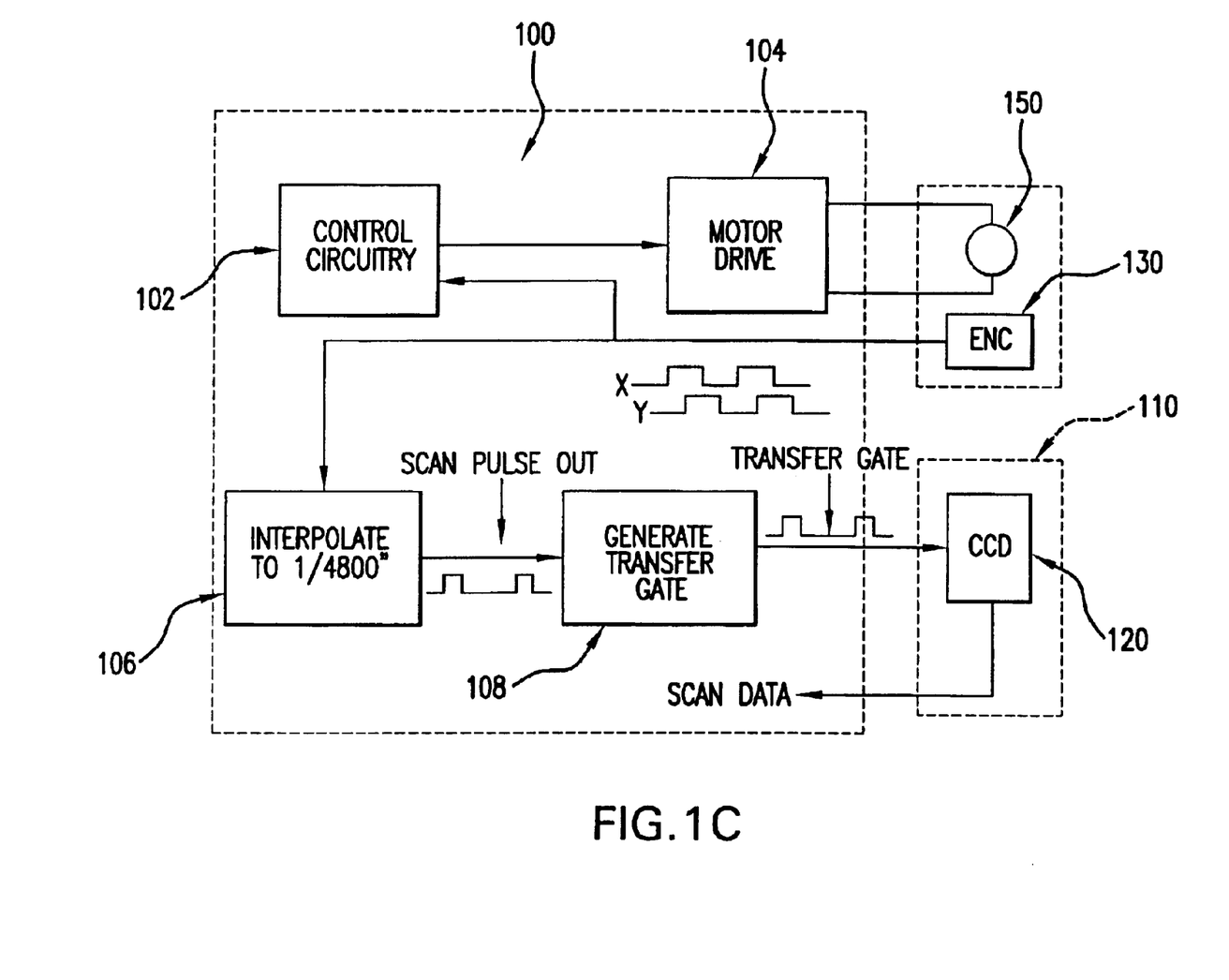

FIG. 1C illustrates control circuitry 100 for controlling the velocity of the motor 150 and for generating scan pulses and transfer signals. This circuitry may be included with other control circuitry in an Application Specific Integrated Circuit for controlling the scanning device.

Referring to FIG. 1C, the encoder signals produced by the encoder 130 are received by a motor control circuit 102. The encoder signals may include different channel phase signals, represented in FIG. 1C as X and Y waveforms. Based on transitions of the channel phase signals, the control circuitry 102 produces timing signals to a motor drive 104 to control the rotational velocity of the motor 150.

The encoder signals are also received by an interpolator 106. The interpolator detects transitions of the encoder signals and generates scan pulses for triggering the scan operation based on the detected transitions. The interpolator determines a frequency at which to generate scan pulses depending on the encoder resolution and the scan resolution desired. For example, if the encoder resolution is the same as the desired scan resolution, scan pulses are generated at each encoder transition. If the encoder resolution is greater than the desired scan resolution, scan pulses are generated at only some of the encoder transitions, depending on the difference in resolution. If the encoder resolution is less than the desired scan resolution, interpolation is needed for generating scan pulses between encoder transitions. According to an exemplary embodiment, the frequency of the scan pulses may be updated at each encoder transition.

Figure 2:
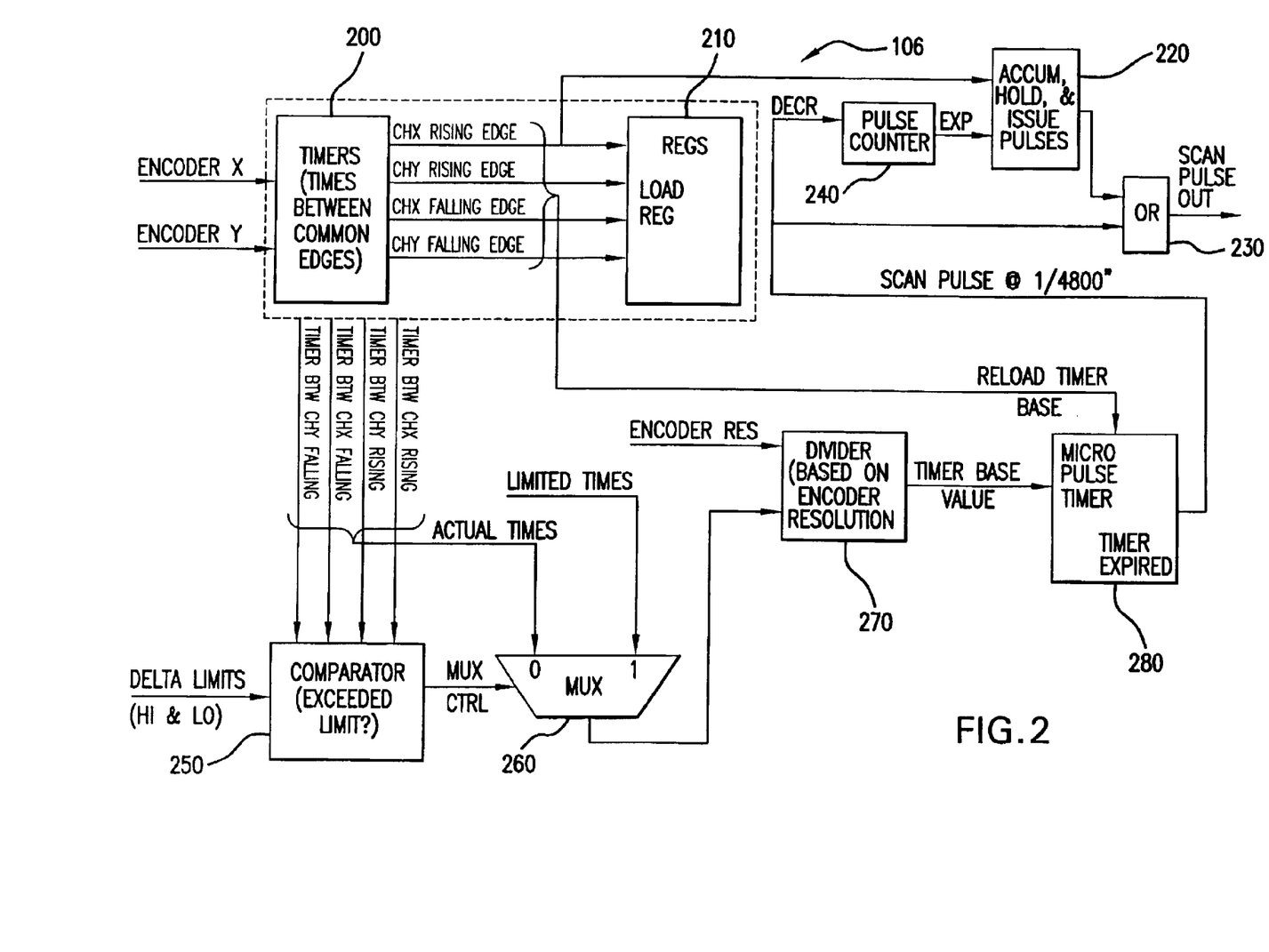
FIG. 2 illustrates an exemplary interpolation circuit in detail.

FIG. 2 illustrates the interpolator 106 shown in FIG. 1C in detail. The interpolator 106 receives signals X and Y representing changes in values or "edges" of the phase channel signals from the encoder 130. The edge signals are received and "filtered" by timers 200 and registers 210 to reduce noise. Each edge acts as a load and reset signal for one of the timers.

According to an exemplary embodiment, there are four timers, one dedicated to each common edge period on a particular channel. Thus, there is one timer dedicated to the CHX rising-to-rising period, one timer dedicated to the CHY rising-to-rising period, one timer dedicated to the CHX falling-to-falling period, and one timer dedicated to the CHY falling-to-falling period. The timers 200 count up once for every clock cycle of the system clock. When a new edge comes in, the number of clock cycles between common edges is loaded in one of the registers 210 and is used to determine the velocity of the scan bar. The timers keep track of the time between common edges of the channel phase signal.

According to an exemplary embodiment, there is an encoder limit feature that can be enabled to limit the amount that the velocity can change (either by speeding up or slowing down) from one period to the next. The amount of change allowed may be programmed in advance. For this purpose, the times between common edges are output from the timer to a comparator 250. The comparator 250 compares the time capture from the previous period with that of the current encoder period and determines the delta or change (+ or −). According to an exemplary embodiment, the comparison is done only between the same periods on the same channel. That is, for example, the current CHX rising-to-rising period is compared with the previous CHX rising to-rising period. The multiplexer 260 selects the limited timer value if the limit is exceeded. The selected timer value may be fed back to the motor to control the velocity.

In addition, the selected timer value is output to a divider 270 to be used in the generation of scan pulses, along with the predetermined encoder resolution. According to an exemplary embodiment, a variety of encoder resolutions may be used, e.g., from 1/300" per quarter period to 1/38,400" per quarter period. The resolution of the encoder input determines how the scan pulse is generated. The scan pulse needs to be consistently generated for every 1/4800" of distance traveled. For the lower resolution encoders, the scan pulses must be generated in between encoder edges. For this purpose, the divider 270 receives the timer values and divides these values based on the predetermined encoder resolution. The scan pulses (or micropulses) are then generated in a timer 280 based on the timer base provided by the new divided timer values.

The expected number of scan pulses that should occur between common edges of the encoder signals is written into the pulse counter 240. As each scan pulse is generated, the pulse counters decrements. If the encoder signal speeds up, it is possible that the expected number of scan pulses will not have enough time to be generated before the next common edge comes in. In this case, an Accumulator 220 increments once for each missed scan pulse. When the encoder slows down, accumulated scan pulses will "trickle" out of the accumulator 220 when the period timer value has increased sufficiently. Selection of scan pulses for output either from the Timer 280 or the Accumulator 220 occurs via the OR circuit 230.

According to exemplary embodiments, there may be two scanning modes. In one mode, scans generate a scan synchronization signal that is continuously updated based off of the encoder signals. In the other mode, synchronization is initiated to the encoder signals, but then the scans are performed at a constant rate, essentially ignoring velocity variations of the mechanism. Both of these modes address the two issues above. However, encoder-based method may provider for better scan image quality.

The constant rate scan mode is simple and straightforward. The scan controller observes the encoder signals until a desired start count is reached. Scanning is then initiated at a constant rate, essentially assuming the scanner mechanism is moving at a constant velocity.

For the encoder-based scan, if the encoder resolution is equal to or greater than the desired scan resolution, no interpolation is needed between encoder counts. There still exists the issue of velocity variations while scanning, which may cause fluctuation in scan frequency.

If encoder resolution is less than the desired scan resolution, interpolation between encoder counts is required. Typically, when this type of interpolation is desired, it is assumed the mechanism's velocity does not change significantly from one encoder period to the next. Therefore, a measurement of the last encoder period is used to predict the next, and this time can be divided into segments to provide interpolation. A single channel of the encoder may be used, since the period of encoder signal channel is the most accurate measure in the encoder.

Figure 3A:
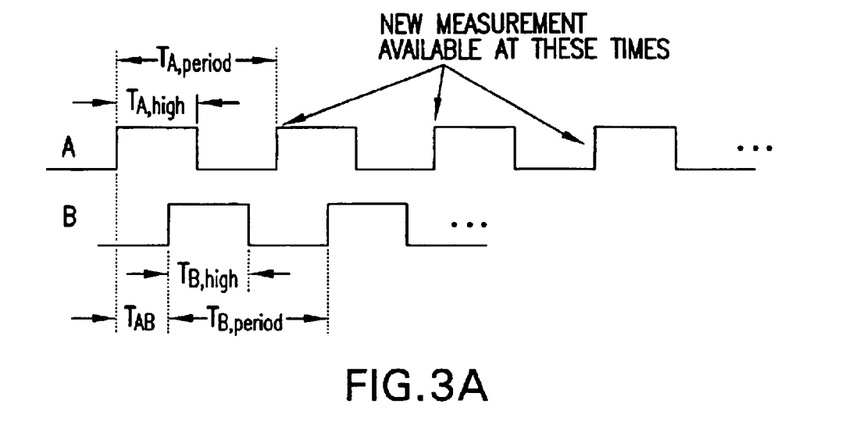
FIG. 3A illustrates exemplary channel A and channel B encoder phase signals and the measurement of channel A transitions according to one embodiment.

FIG. 3A illustrates exemplary encoder signal waveforms. The encoder produces a channel A phase signal and a channel B phase signal. These phase signals are 90 degrees out of phase with each other. Since the encoder provides signals at each rotation of the rotary device through a certain angle, the frequency of the encoder signal corresponds to a particular mechanism velocity. Thus, the frequency (or period, represented in the figure by $T_A$ or $T_B$) is a very accurate measure of the speed of the scan mechanism. Other encoder measures, such as the duty cycle of a channel $T_{A,high}$ or $T_{B,high}$ or the phase between channels ($T_{AB}$) do not provide the same consistency as the period measurement.

Because of this consistency issue, the time between consecutive transitions of the encoder signals is captured and used to calculate and control the velocity of the scan mechanism.

According to one embodiment, a single encoder signal channel may be used. According to this embodiment, the time between consecutive transitions of a single encoder channel is captured and then used to calculate mechanism speed. For example, as shown in FIG. 3A, the time between rising edges of channel A may be measured and then used to calculate the scan mechanism speed.

Figure 3B:
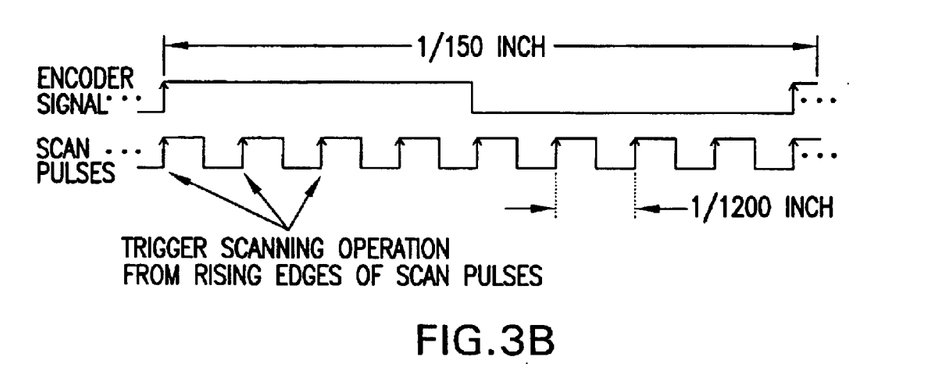
FIG. 3B illustrates interpolation from an encoder signal to a scan signal according to an exemplary embodiment.

If the encoder resolution is less than the desired scan resolution, interpolation may be performed. FIG. 3B illustrates interpolation from a 150 lines-per-inch single encoder signal channel to a 1200 scan-per-inch scan pulse signal.

The single channel method works well at relatively high speeds, when the scan mechanism moves fast with regard to the encoder dimensions (e.g., lines per inch). This is because only small changes in velocity are expected from period to period. However, for a high resolution scan, the velocity of the scanner mechanism can be extremely slow. Large changes in velocity may occur within a single period of the encoder signal. Thus, the assumption of variations being insignificant do not hold as well. It is more accurate for this type of scanning to measure the frequency or period (i.e., velocity) of the encoder signals using both encoder signal channels, as shown in FIG. 4A.

Figure 4A:
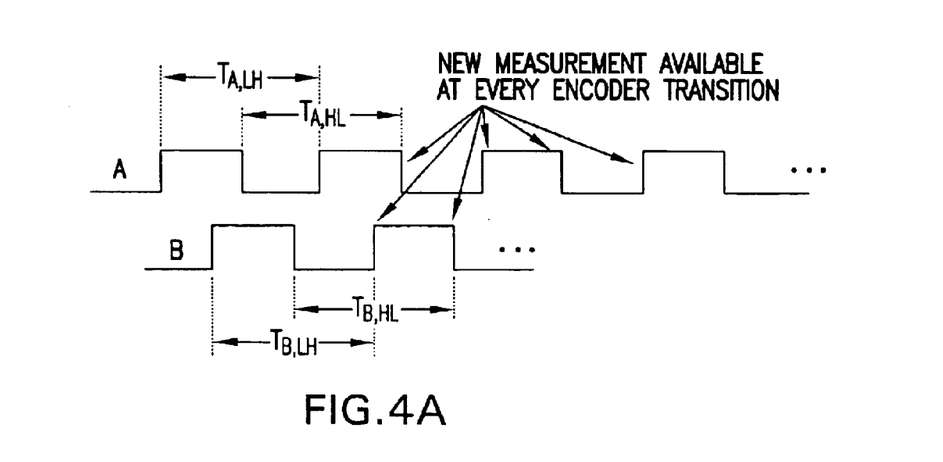
FIGS. 4A and 4B illustrate exemplary channel A and channel B encoder phase signals and the measurement of transitions of both channels according to exemplary embodiments.
Figure 4B:
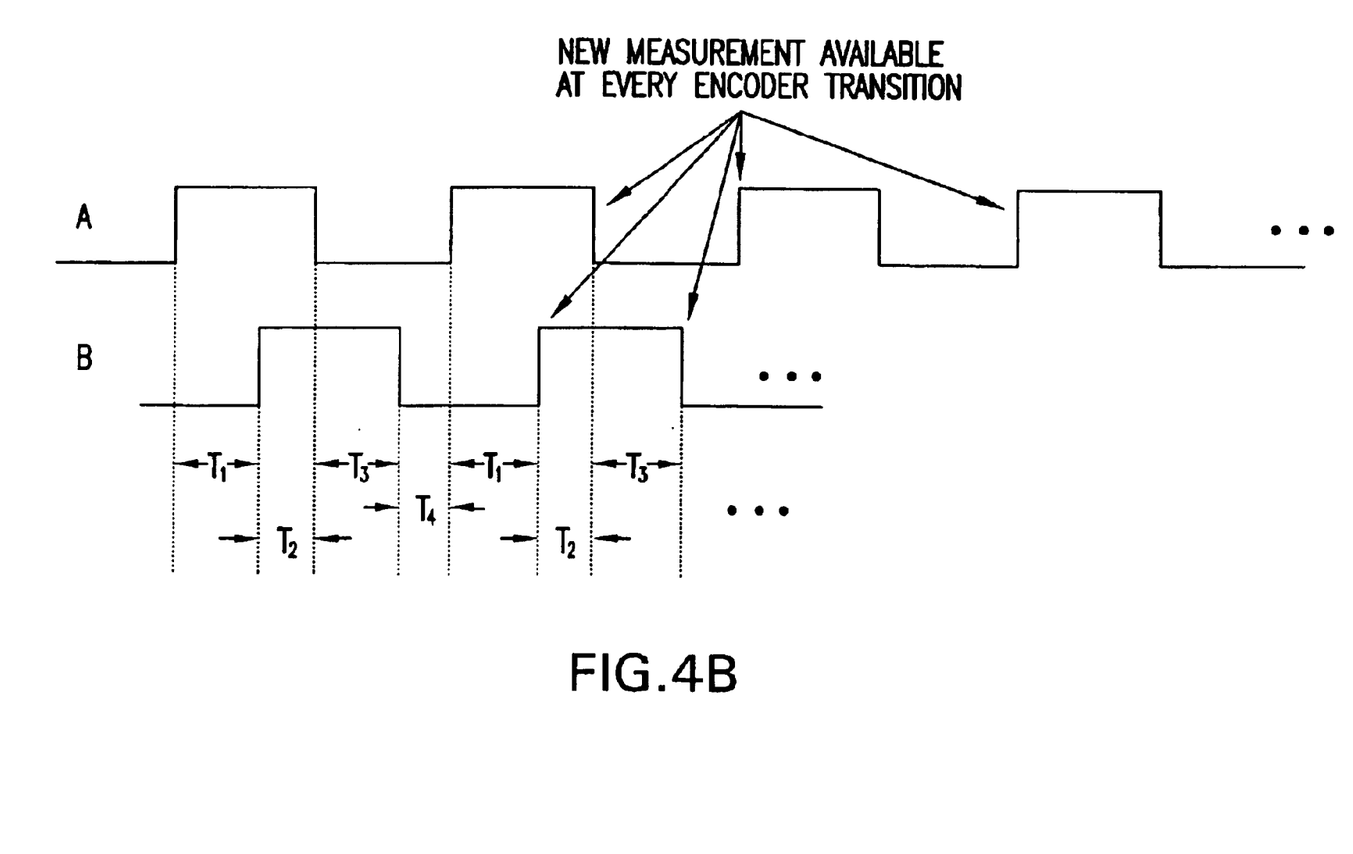

FIG. 4B illustrates an alternative implementation, using a single timer that provides the time between any transitions on any encoder channel. The past four of these times can be summed to obtain the most recent period measure.

Figure 5:
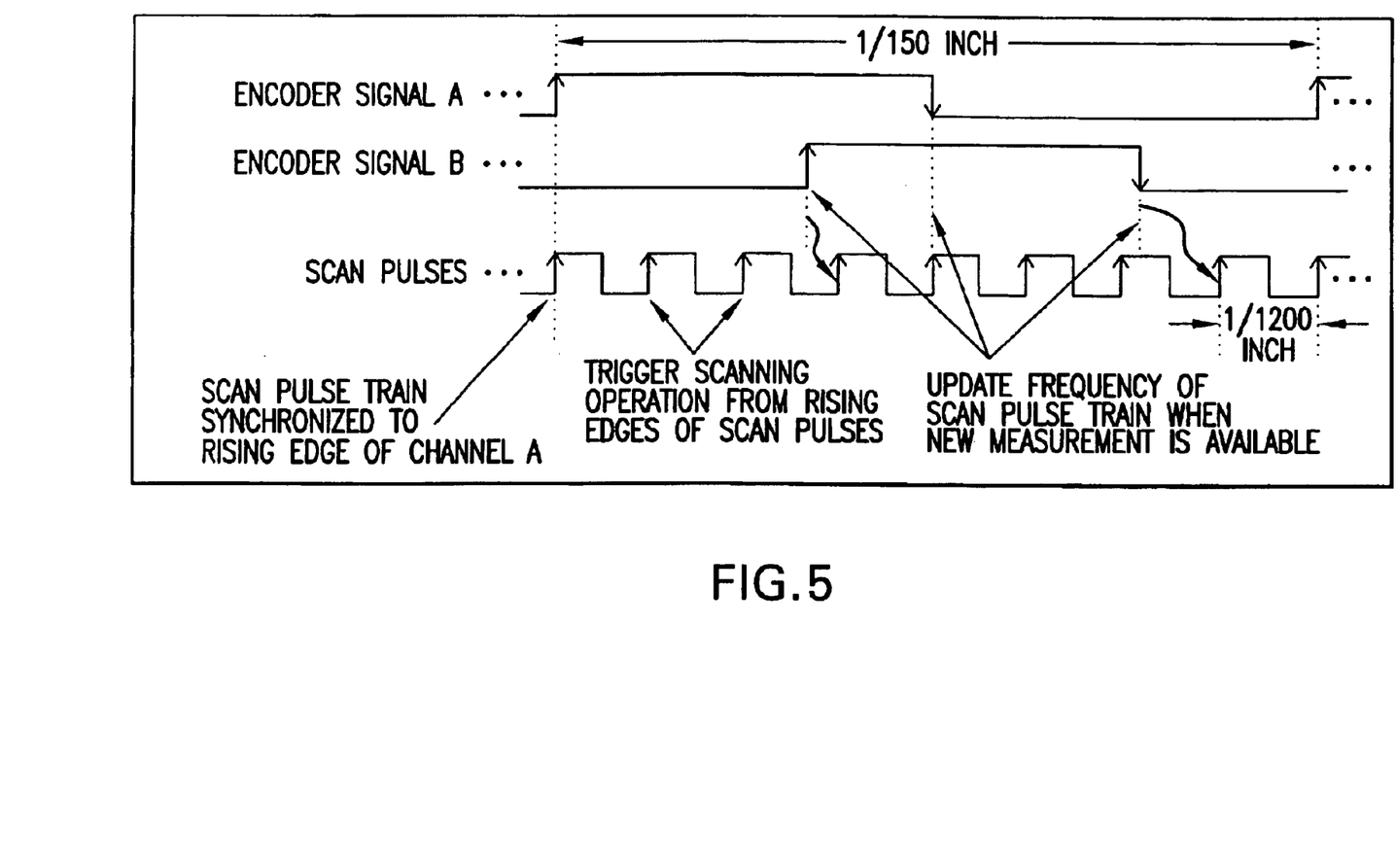
FIG. 5 illustrates interpolation from encoder signals to a scan signal according to an exemplary embodiment.

FIG. 5 illustrates interpolation from 150 line-per-in encoder signals to a 1200 scan-per inch scan pulse signal. In this example, the scan pulse train is initially synchronized to the rising edge of channel A. The frequency of the scan pulse signal is updated at each transition of the encoder signals.

The methods illustrated in FIGS. 4A, 4B and 5 provide the same precision and accuracy in velocity measurement as the single channel method but provide this information four times as often.

None of the measurements according to exemplary embodiments are affected by duty cycle or channel-to-channel phase error. Thus, the measurements are extremely consistent.

For controlling output of the scanned data from the scan element, transfer signals are produced that are synchronized with the scan pulse signal, taking into account velocity variations of the scan mechanism.

For the generation of the transfer signal, e.g., a Transfer Gate (TG) or a Start signal, the scan pulses are input to an accumulator, and the accumulator reproduces the transfer signal with the appropriate timings. As long as the accumulator is non-zero, a new transfer signal cycle is initiated. In this way, if the frequency of the encoder signal exceeds the limitations of the scan element (i.e., the scan mechanism is moving too fast), the accumulator accumulates pulses, while producing a transfer signal with the specified time period. When the mechanism slows down, the transfer signal catches up until the accumulator is again zero.

In the following description, the transfer signal is described as a TG signal used in a CCD. It will be appreciated, however, that the transfer signal may be any other kind of transfer signal for controlling transfer of data out of a sensor array. For example, the transfer signal may also be a Start signal used in a CIS.

According to an exemplary embodiment, controlling the transfer signal assists in making the effective exposure time of the sensor array constant when the motion of the scan bar is not constant. The time that the transfer signal becomes active is some predetermined amount of time after the previous line scan is completed.

Figure 6:
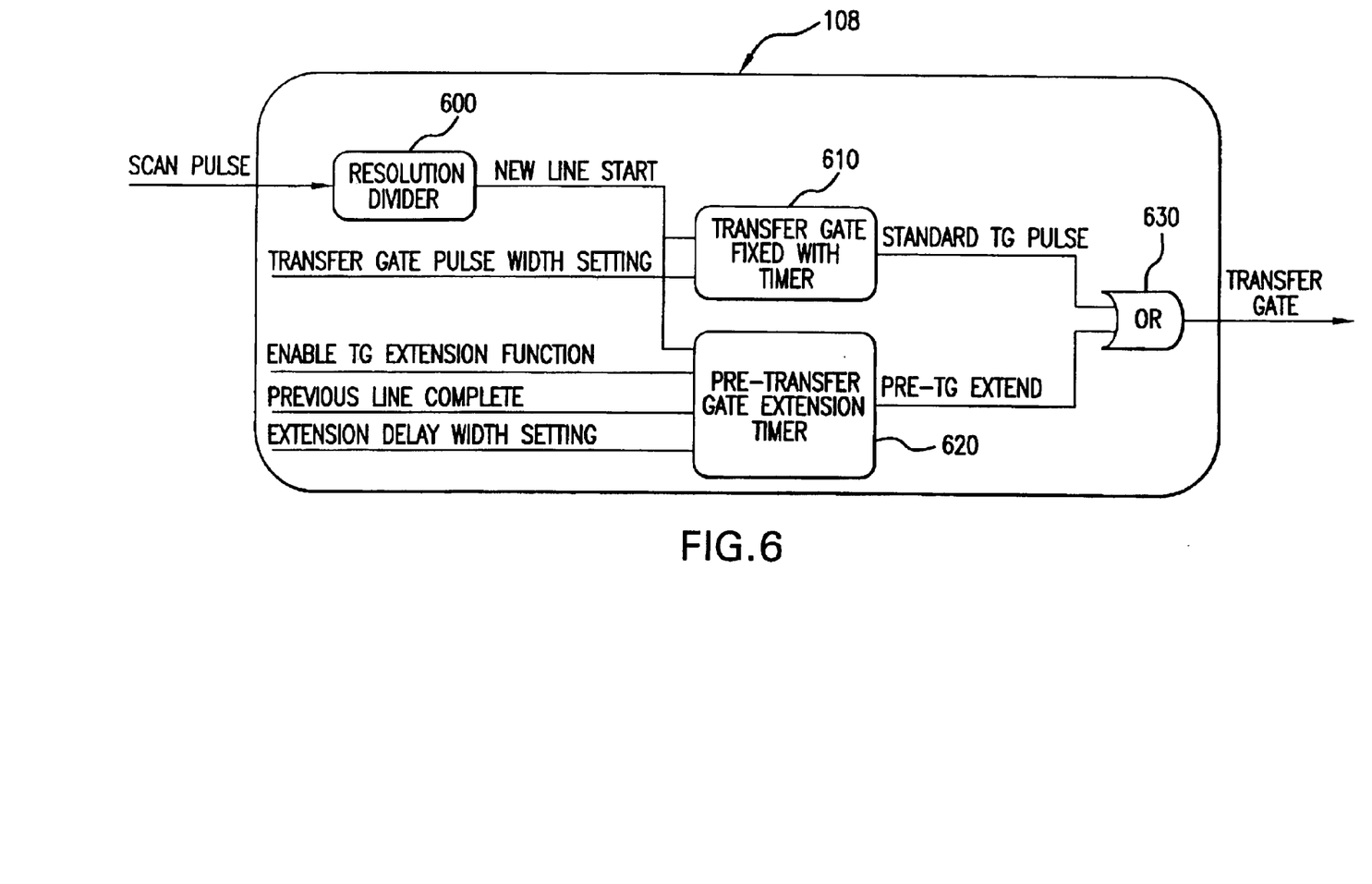
FIG. 6 illustrates a transfer gate generation circuit according to an exemplary embodiment.

FIG. 6 illustrates in detail an exemplary circuit for generating transfer signals. The circuit includes a resolution divider 600 that receives a scan pulse from the interpolator 106. The scan pulse is the 1/4800" indication from the motor control block. The resolution divider 600 counts scan pulse indications to determine if movement has occurred to begin the next line. This is used, e.g., when a resolution less that 1/4800" is required for the scan operation. For example, if the requested resolution is actually 1/2400", the resolution divider looks for two scan pulses before issuing a new line start signal. The new line start signal is received by the TG fixed width timer 610, along with a predetermined TG pulse width setting. The TG fixed width timer 610 produces a fixed-width pulse on the standard pulse signal. This starts the indication of the start of a new line from the resolution divider 600. The duration of this pulse is programmed via the transfer gate pulse width setting.

The new line start signal from the resolution divider 600 is also received by a pre-transfer gate extension timer 620. When enabled via a preprogrammed enable TG extension function signal, this timer looks for an end-of-line indication to occur, via the previous line complete signal. When an end-of-line is detected, the pre-transfer gate extension timer begins a timer that runs for the duration programmed via a predetermined extension delay width setting. Once the timer expires, the PreTG extend signal is asserted. This signal is logically OR'd with the standard TG pulse signal in logic 630. Since this signal occurs before the standard TG pulse, the TG output signal is extended by the PreTG extend signal. The New line start signal is used to inform the pre TG extension timer when to de-assert the Pre-TG extend signal. Once the new line indication occurs, the TG pulse is asserted for the duration of the standard TG pulse signal and is then deasserted. It will remain deasserted until the indication of the end of the line.

Producing TG signals in this fashion makes the exposure period of the TG signal, e.g., the periods during which the TG signal is low, constant. Fluctuations that arise from velocity variation are "absorbed" by the TG high period. In this way, the exposure time of the sensor can be fixed regardless of motor velocity variations.

Figure 7:
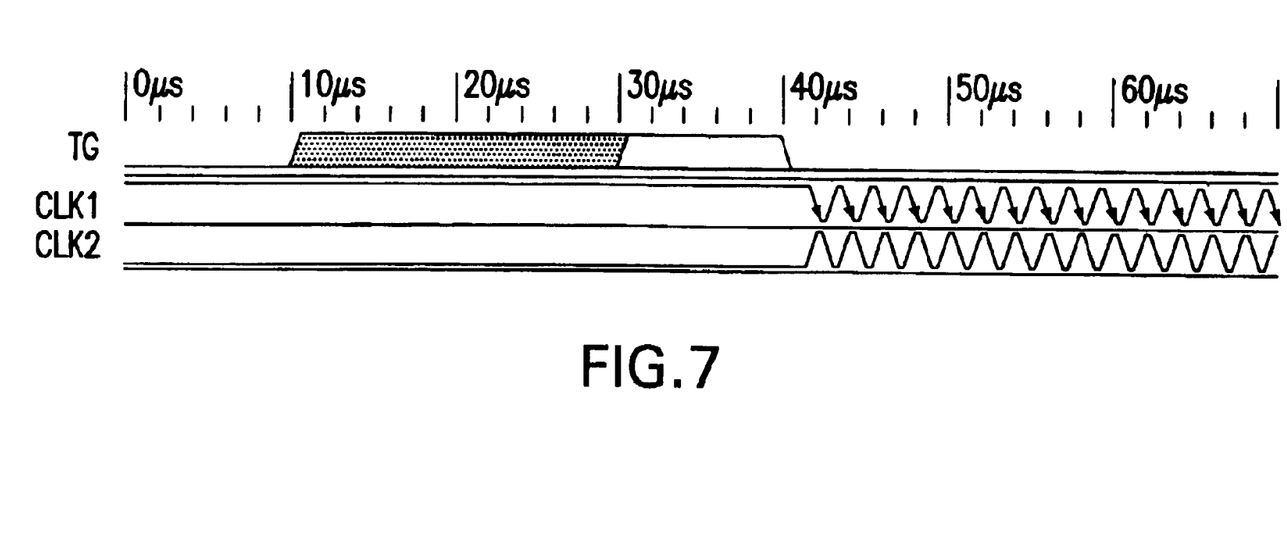
FIG. 7 illustrates exemplary waveforms of transfer signals and clock signals for controlling output of scanned data.

FIG. 7 illustrates progression of a TG signal and clock signals CLK1 and CLK2 used for controlling output of scanned data. The shaded part of the TG waveform indicates the region in which TG may become active. The exact time that it will become active will be some predetermined amount of time after the previous line scan was completed. So, the width of the shaded area represents the amount of tolerable uncertainty in the encoder variations. Once the data is transferred, the clocks to the sensor are driven, causing the scanned image data to be shifted out.

Figure 8:
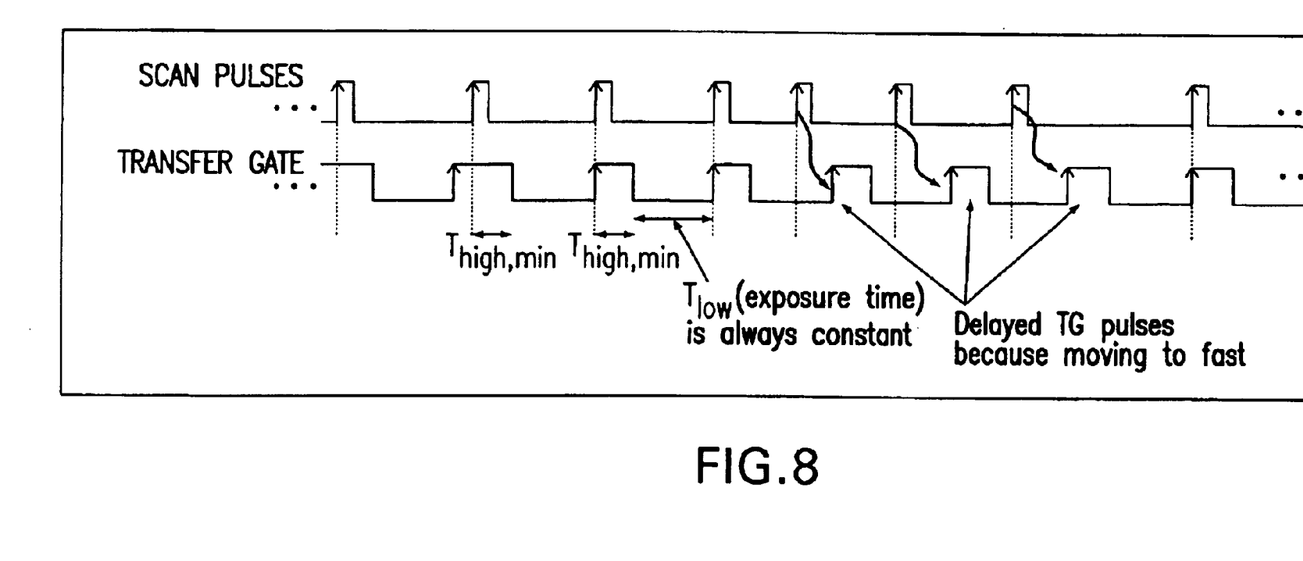
FIG. 8 illustrates synchronization of a transfer signals to scan pulses.

FIG. 8 illustrates the effects of variations in the frequency of the scan pulses on the generation of transfer signals. In this figure, the high periods of the TG signals represent a transfer state, and the low periods of the TG signal represent an exposure state. It will be appreciated, however, that the transfer state and exposure state do not necessarily have to correspond to the high and low periods, respectively, of the transfer signal. In FIG. 8, the high periods of the TG signals are represented as $T_{high,min}$, and the low periods of the TG signals are indicated as $T_{low}$. As can be seen from this figure, the duration of the low period is always constant. Thus, the exposure time of the scanning device is always constant. The high periods of the TG signals are not constant but do not fall below $T_{high,min}$ As the frequency of the scan pulses increases, the duration of the high period is decreased until at point at which $T_{high,min}$ is reached. Then, the scan pulses are accumulated until the scan pulse frequency decreased. While the scan pulses are accumulated, TG signals having a high period with the duration $T_{high,min}$ are produced.

Figure 9:
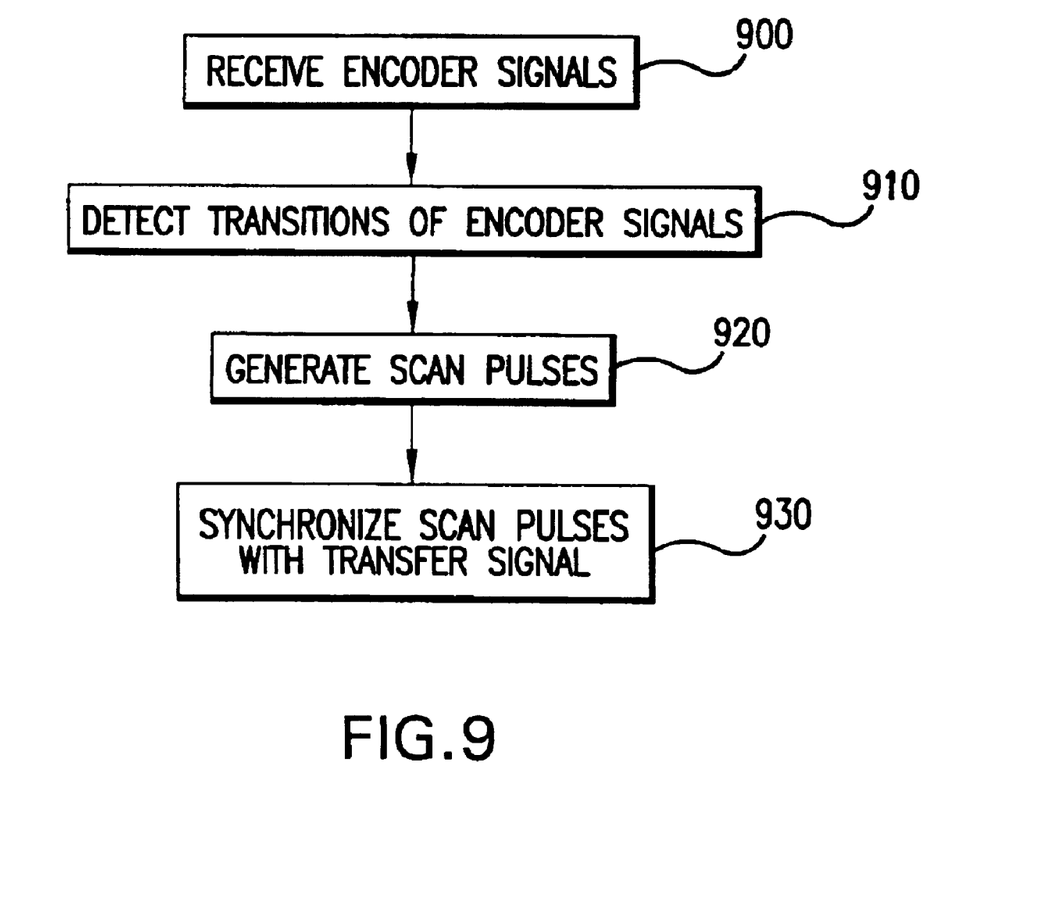
FIG. 9 illustrates an exemplary method for synchronizing the motion of a scan mechanism with a scanning operation according to an exemplary embodiment.

FIG. 9 illustrates an exemplary method for synchronizing a scan operation with the motion of a scan mechanism. The method begins at step 900 at which encoder signals are received. Transitions of the encoder signals are detected at step 910. Scan pulses are then generated at step 920, using one or both channels of the encoder signals, to trigger scanning. According to an exemplary embodiment, a difference in the encoder resolution and the desired scan resolution may be compensated for in the generation of the scan pulses. At step 930, transfer signals are generated in synchronization with the scan pulses for controlling output of the scanned data. According to an exemplary embodiment, this synchronization takes velocity variations of the scan mechanism into account by, e.g., varying the duration of the transfer state of the transfer signals.

It should be understood that the foregoing description and accompanying drawings are by example only. A variety of modifications are envisioned that do not depart from the scope and spirit of the invention. The above description is intended by way of example only and is not intended to limit the present invention in any way.

What is claimed is:

1. A method for synchronizing output of a scanning device with the motion of a scan mechanism within the device, comprising the steps of:
   receiving encoder signals indicative of a position of the scan mechanism relative to a scan platen or an object being scanned;
   detecting transitions of the encoder signals;
   generating scan pulses for triggering a scan operation by a scan element at a desired scan resolution based on the detected transitions of the encoder signals, wherein the scan pulses are accumulated until the frequency of the scan pulses decreases to a predetermined frequency; and
   generating a transfer signal, the transfer signal being generated with a transfer state of a first duration while the scan pulses are accumulated, the transfer signal controlling output of data from the scan element in synchronization with the scan pulses, accounting for variations in velocity of the scan mechanism.

2. The method of claim 1, wherein the scan mechanism includes a scan bar, and the motion of the scan bar is controlled by a DC motor.

3. The method of claim 1, wherein the steps of receiving, detecting, generating the scan pulses, and generating the transfer signal are performed during a starting portion of the scan operation.

4. The method of claim 1, wherein the steps of receiving, detecting, generating the scan pulses and generating the transfer signal are performed throughout a scan operation.

5. The method of claim 1, wherein the encoder signals include a single channel phase signal.

6. The method of claim 5, wherein the step of detecting includes detecting low to high and high to low transitions of the single channel phase signal.

7. The method of claim 1, wherein the encoder signals include a channel A phase signal and a channel B phase signal.

8. The method of claim 7, wherein the step of detecting includes detecting transitions of the channel A phase signal from low to high and from high to low and detecting transitions of the channel B phase signal from low to high and from high to low.

9. The method of claim 1, wherein the variations of the velocity of the scan mechanism cause variations of the frequency at which the scan pulses are generated.

10. The method of claim 9, wherein the step of generating scan pulse signals includes updating a frequency of scan pulses at each detected transition of the encoder signals.

11. The method of claim 1, wherein the scan operation is triggered from rising edges of the scan pulses.

12. The method of claim 1, wherein the transfer signal transitions between an exposure state and a transfer state, and data is transferred from the scan element when the transfer signal is in the transfer state.

13. The method of claim 12, wherein the transfer signal is low during the exposure state and high during the transfer state.

14. The method of claim 12, wherein the variations of the velocity of the scan mechanism cause variations of the frequency at which the scan pulses are generated, and the step of generating the transfer signal includes varying the duration of the transfer state for the transfer signal in relation to the variations of the frequency at which the scan pulses are generated.

15. The method of claim 1, wherein the step of generating scan pulses includes compensating for a difference in an encoder resolution and the desired scan resolution.

16. The method of claim 1, wherein the scanning device scans data at a high resolution.

17. An apparatus for synchronizing output of a scanning device with the motion of a scan mechanism within the device, comprising:
   an encoder mechanism having an encoder and an encoder wheel for generating encoder signals;
   a DC motor coupled to said encoder wheel for rotating said encoder wheel;
   a scan pulse generator for receiving the encoder signals, the encoder signals being indicative of an angular position of said DC motor and indicative a position of the scan mechanism relative to a scan platen or an object being scanned, detecting transitions of the encoder signals, and generating scan pulses for triggering a scan operation by the scan element at a desired scan resolution based on the detected transitions of the encoder signals; and a transfer signal generator for generating a transfer signal for controlling output of data from the scan element in synchronization with the scan pulses, wherein the transfer signal generator accounts for variations in velocity of the scan mechanism.

18. The apparatus of claim 17, wherein the scan mechanism includes a scan bar, and the motion of scan bar is controlled by the DC motor.

19. The apparatus of claim 17, wherein the scan pulse generator receives the encoder signals, detects transitions of the encoder signals, and generates scan pulses and the transfer signal generator generates the transfer signal during a starting portion of the scan operation.

20. The apparatus of claim 17, wherein the scan pulse generator receives the encoder signals, detects transitions of the encoder signals, and generates scan pulses, and the transfer signal generator generates the transfer signal throughout the scan operation.

21. The apparatus of claim 17, wherein the encoder signals include a single channel phase signal.

22. The apparatus of claim 21, wherein the scan pulse generator detects low to high and high to low transitions of the single channel phase signal.

23. The apparatus of claim 17, wherein the encoder signals include a channel A phase signal and a channel B phase signal.

24. The apparatus of claim 23, wherein the scan pulse generator detects transitions of the channel A phase signal from low to high and from high to low and detects transitions of the channel B phase signal from low to high and from high to low.

25. The apparatus of claim 17, wherein the variations of the velocity of the scan mechanism cause variations of the frequency at which scan pulses are generated.

26. The apparatus of claim 25, wherein the scan pulse generator updates a frequency of the scan pulses at each detected transition of the encoder signals.

27. The apparatus of claim 17, wherein the scan operation is triggered from rising edges of the scan pulses.

28. The apparatus of claim 17, wherein the transfer signal transitions between an exposure state and a transfer state, and data is output from the scan element when the transfer signal is in the transfer state.

29. The apparatus of claim 28, wherein the transfer signal is low during the exposure state and high during the transfer state.

30. The apparatus of claim 28, wherein the variations of the velocity of the scan mechanism cause variations of the frequency at which the scan pulses are generated, and the transfer signal generator generates a transfer signal in synchronization with the scan pulses by varying the duration of the transfer state for the transfer signal in relation to the variations of the frequency at which the scan pulses are generated.

31. The apparatus of claim 17, wherein the scan pulse generator compensates for a difference in the encoder resolution and the desired scan resolution in the generation of the scan pulses.

32. The apparatus of claim 17, wherein the scanning device scans data at a high resolution.

33. A method for generating scan pulses for triggering a scan operation, comprising the steps of:
   determining a difference between a desired scan resolution and a resolution of encoder signals indicative of a position of the scan mechanism relative to a scan platen or an object being scanned; and
   generating scan pulses for triggering a scan operation by a scan element, compensating for differences in the encoder signal resolution and the desired scan resolution,
   wherein if the encoder signal resolution is less than the desired scan resolution, the difference is compensated for by interpolating between encoder signal transitions to generate the scan pulses.

34. The method of claim 33, wherein if the encoder resolution is greater than the desired scan resolution, the difference is compensated for by generating scan pulses only at some of encoder signal transitions.

35. The method of claim 33, wherein if the encoder resolution is the same as the desired scan resolution, scan pulses are generated at each encoder signal transition.

36. The method of claim 33, wherein variations of the velocity of the scan mechanism cause variations of the frequency at which scan pulses are generated.

37. The method of claim 36, wherein the frequency at which the scan pulses are generated is updated at every encoder signal transition.

38. An apparatus for generating scan pulses for triggering a scan operation, comprising:
   means for determining a difference between a desired scan resolution and a resolution of encoder signals indicative of a position of the scan mechanism relative to a scan platen or an object being scanned; and
   means for generating scan pulses for triggering a scan operation by a scan element, compensating for differences in the encoder signal resolution and the desired scan resolution.

39. The apparatus of claim 38, wherein if the encoder signal resolution is less than the desired scan resolution, the difference is compensated for by interpolating between encoder signal transitions to generate the scan pulses.

40. The apparatus of claim 38, wherein if the encoder resolution is greater than the desired scan resolution, the difference is compensated for by generating scan pulses only at some of encoder signal transitions.

41. The apparatus of claim 38, wherein if the encoder resolution is the same as the desired scan resolution, scan pulses are generated at each encoder signal transition.

42. The apparatus of claim 38, wherein variations of the velocity of the scan mechanism cause variations of the frequency at which scan pulses are generated.

43. The apparatus of claim 42, wherein the frequency at which the scan pulses are generated is updated at every encoder signal transition.

44. A method for synchronizing output of a scanning device with the motion of a scan mechanism within the device, comprising the steps of:
   receiving scan pulses for triggering a scan operation, wherein the scan pulses are accumulated until the frequency of the scan pulses decreases to a predetermined frequency;
   generating a transfer signal, wherein while the scan pulses are accumulated, the transfer signal is generated with a transfer state of a minimum duration; and
   synchronizing the transfer signal controlling output of data from the scan element with the scan pulses, accounting for variations in velocity of the scan mechanism.

45. The method of claim 44, wherein the transfer signal transitions between an exposure state to a transfer state, and data is transferred from the scan element when the transfer signal is in the transfer state.

46. The method of claim 45, wherein the transfer signal is low during the exposure state and high during the transfer state.

47. The method of claim 45, wherein the variations of the velocity of the scan mechanism cause variations of the frequency of the scan pulses, and the step of synchronizing includes varying the duration of the transfer state for the transfer signal in relation to the variations of the frequency of the scan pulses.

48. The method of claim 47, wherein the step of varying includes decreasing the duration of the transfer state for the transfer signal in proportion to increases in the frequency of the scan pulses until the duration of the transfer state reaches a minimum duration.

49. The method of claim 48, wherein the step of synchronizing further includes accumulating the generated scan pulses when the minimum duration for the transfer state of the transfer signal is reached.

50. The method of claim 44, wherein the step of synchronizing includes maintaining a constant duration for the exposure state of the transfer signal.

51. The method of claim 50, wherein the constant duration for the exposure state corresponds to a constant exposure time for the scanning device.

52. An apparatus for synchronizing output of a scanning device with the motion of a scan mechanism within the device, the apparatus performing the steps of:
  receiving scan pulses for triggering a scan operation, wherein the scan pulses are accumulated until the frequency of the scan pulses decreases to a predetermined frequency;
  generating a transfer signal, wherein while the scan pulses are accumulated, the transfer signal is generated with a transfer state of a minimum duration; and
  synchronizing a transfer signal controlling output of data from the scan element with the scan pulses, accounting for variations in velocity of the scan mechanism.

53. The apparatus of claim 52, wherein the transfer signal transitions between an exposure state to a transfer state, and data is transferred from the scan element when the transfer signal is in the transfer state.

54. The apparatus of claim 53, wherein the transfer signal is low during the exposure state and high during the transfer state.

55. The apparatus of claim 53, wherein the variations of the velocity of the scan mechanism cause variations of the frequency of the scan pulses, and the step of synchronizing includes varying the duration of the transfer state for the transfer signal in relation to the variations of the frequency of the scan pulses.

56. The apparatus of claim 55, wherein the step of varying includes decreasing the duration of the transfer state for the transfer signal in proportion to increases in the frequency of the scan pulses until the duration of the transfer state reaches a minimum duration.

57. The apparatus of claim 56, wherein the step of synchronizing further includes accumulating the generated scan pulses when the minimum duration for the transfer state of the transfer signal is reached.

58. The apparatus of claim 57, wherein the scan pulses are accumulated until the frequency of the scan pulses decreases to a predetermined frequency.

59. The apparatus of claim 58, wherein while scan pulses are accumulated, a transfer signal is generated with a transfer state of the minimum duration.

60. The apparatus of claim 52, wherein the step of synchronizing includes maintaining a constant duration for the exposure state of the transfer signal.

61. The apparatus of claim 60, wherein the constant duration for the exposure state corresponds to a constant exposure time for the scanning device.

* * * * *